United States Patent
Akiba et al.

(10) Patent No.: US 11,383,828 B2
(45) Date of Patent: Jul. 12, 2022

(54) LANDING GEAR OF ROTORCRAFT

(71) Applicant: SUBARU CORPORATION, Tokyo (JP)

(72) Inventors: Kousaburou Akiba, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 337 days.

(21) Appl. No.: 16/746,272

(22) Filed: Jan. 17, 2020

(65) Prior Publication Data

US 2020/0148336 A1   May 14, 2020

Related U.S. Application Data

(63) Continuation of application No. PCT/JP2018/014698, filed on Apr. 6, 2018.

(30) Foreign Application Priority Data

Jul. 31, 2017 (JP) .............................. JP2017-147866

(51) Int. Cl.
*B64C 25/52* (2006.01)
*B64C 25/32* (2006.01)

(52) U.S. Cl.
CPC ........ *B64C 25/52* (2013.01); *B64C 2025/325* (2013.01)

(58) Field of Classification Search
CPC .......................... B64C 25/52; B64C 2025/325
See application file for complete search history.

(56) References Cited

U.S. PATENT DOCUMENTS

| 4,645,143 A | 2/1987 | Coffy |
| 5,211,359 A | 5/1993 | Rene et al. |
| 5,224,669 A | 7/1993 | Guimbal |
| 6,244,538 B1 * | 6/2001 | Howard ................. B64C 25/52 |
| | | 244/104 R |

(Continued)

FOREIGN PATENT DOCUMENTS

| CN | 106240805 A | * 12/2016 |
| JP | 11-049097 A |   2/1999 |

(Continued)

OTHER PUBLICATIONS

Extended European Search Report issued in corresponding European Patent Application No. 18841004.7-1010, dated Mar. 18, 2021.

(Continued)

*Primary Examiner* — Joseph W Sanderson
(74) *Attorney, Agent, or Firm* — McDermott Will & Emery LLP (57) ABSTRACT

Aspects of the subject technology relate to a landing gear of a rotorcraft including two skid tubes and a cross tube. The cross tube couples the skid tubes to each other and attaches the skid tubes to a fuselage of the rotorcraft. At least a part of the cross tube is made of a composite material to achieve sufficient absorption of energy while preventing the fuselage from coming into contact with a ground surface, at the time of landing the rotorcraft, under a more satisfactory condition. The rotorcraft includes the landing gear to achieve sufficient absorption of energy while preventing the fuselage from coming into contact with the ground surface, at the time of landing the rotorcraft, under a more satisfactory condition.

14 Claims, 5 Drawing Sheets

(56) References Cited

U.S. PATENT DOCUMENTS

| | | | | |
|---|---|---|---|---|
| 7,467,763 | B2* | 12/2008 | Kismarton | B64C 25/10 244/1 OOR |
| 8,998,134 | B2* | 4/2015 | Fews | B64C 25/52 244/108 |
| 9,994,308 | B2* | 6/2018 | Bernier | B21D 53/92 |
| 2002/0008175 | A1 | 1/2002 | Howard et al. | |
| 2006/0284009 | A1* | 12/2006 | Kismarton | B64C 25/10 244/104 LS |
| 2011/0210201 | A1* | 9/2011 | Fews | B64C 25/52 244/108 |

FOREIGN PATENT DOCUMENTS

| | | |
|---|---|---|
| JP | 2004-098832 A | 4/2004 |
| JP | 2005-343309 A | 12/2005 |
| JP | 2007-106267 A | 4/2007 |
| JP | 2009-073209 A | 4/2009 |
| WO | 2009/155553 A1 | 12/2009 |

OTHER PUBLICATIONS

Translation of the International Preliminary Report on Patentability, dated Feb. 13, 2020 and Translation of the Written Opinion of the International Searching Authority, dated Feb. 26, 2020 issued in International Patent Application No. PCT/JP2018/014698.

International Search Report issued in corresponding International Patent Application No. PCT/JP2018/014698, dated Jun. 26, 2018, with English translation.

Japanese Notice of Reasons for Refusal issued in corresponding Japanese Patent Application No. 2019-533894, dated Oct. 27, 2020, with English translation.

* cited by examiner

LANDING GEAR OF ROTORCRAFT

CROSS REFERENCES TO RELATED APPLICATIONS

This is a continuation of Application PCT/JP2018/14698, filed on Apr. 6, 2018.

This application is based upon and claims the benefit of priority from Japanese Patent Application No. 2017-147866, filed on Jul. 31, 2017; the entire contents of which are incorporated herein by reference.

FIELD

Implementations described herein relate generally to a landing gear of a rotorcraft, a rotorcraft and a method of landing a rotorcraft.

BACKGROUND

Conventionally, a skid is known as a landing gear of a rotorcraft (for example, refer to Japanese Patent Application Publication JP2005-343309 A, Japanese Patent Application Publication JP2004-098832 A and Japanese Patent Application Publication JP2009-073209 A). A skid is a landing gear including sliding members each having a shape similar to that of a sled. When a rotorcraft lands, energy is absorbed by deformation of a skid.

In order to secure the sufficient absorption amount of energy at the time of landing a rotorcraft, it is necessary to generate a large deformation in a skid. On the other hand, when a skid is excessively deformed, a fuselage may come into contact with a ground surface. Therefore, when a skid is designed, it is important to achieve both sufficient absorption of energy and preventing a fuselage from coming into contact with a ground surface.

Accordingly, an object of the present invention is to achieve both sufficient absorption of energy and preventing a fuselage from coming into contact with a ground surface, at the time of landing a rotorcraft, under a more satisfactory condition.

SUMMARY OF THE INVENTION

In general, according to one implementation, a landing gear of a rotorcraft includes two skid tubes and a cross tube. The cross tube couples the skid tubes to each other and attaches the skid tubes to a fuselage of the rotorcraft. At least a part of the cross tube is made of a composite material.

Further, according to one implementation, a rotorcraft includes the above-mentioned landing gear.

Further, according to one implementation, a method of landing a rotorcraft includes: constituting at least a part of a cross tube with a composite material; and preventing the fuselage from contacting a ground while securing an absorption amount of energy, with the at least the part of the cross tube, when the rotorcraft lands. The cross tube couples two skid tubes to each other. The cross tube attaches the skid tubes to a fuselage of the rotorcraft. The skid tubes compose a landing gear of the rotorcraft.

DETAILED DESCRIPTION

A landing gear of a rotorcraft, a rotorcraft and a method of landing a rotorcraft according to implementations of the present invention will be described with reference to the accompanying drawings.

(First Implementation)
(Structure and Function)

Figure 1:
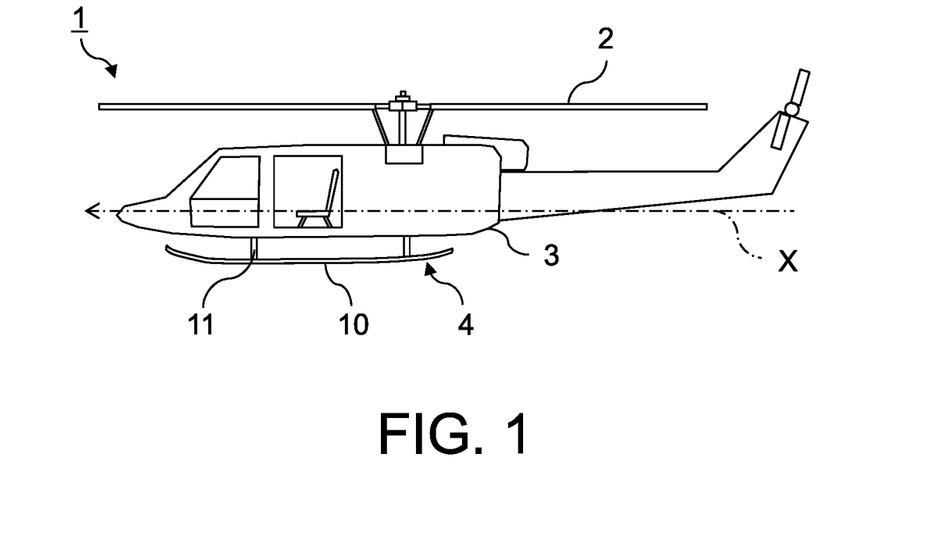
FIG. 1 is a side view of a rotorcraft including a skid as a landing gear according to the first implementation of the present invention.
Figure 2:
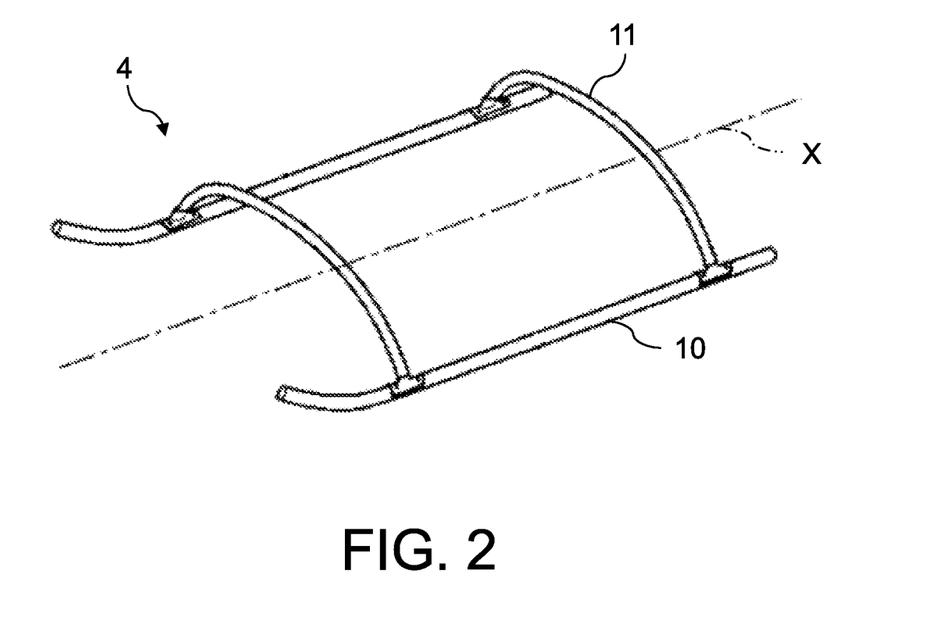
FIG. 2 is a perspective view showing a structure of the skid attached to the rotorcraft shown in FIG. 1.

FIG. 1 is a side view of a rotorcraft including a skid as a landing gear according to the first implementation of the present invention, and FIG. 2 is a perspective view showing a structure of the skid attached to the rotorcraft shown in FIG. 1.

As shown in FIG. 1, a rotorcraft 1 includes a rotor 2, a fuselage 3 and a skid 4 serving as a landing gear. The rotor 2 and the skid 4 are attached to the fuselage 3. The skid 4 is typically composed of two skid tubes 10, each having a shape similar to that of a sled, and two curved cross tubes 11 for attaching the skid tubes 10 to the fuselage 3 as shown in FIG. 1 and FIG. 2.

Each skid tube 10 is a sliding member placed in parallel to the vertical axis X which is one of reference axes of the rotorcraft 1. Meanwhile, each cross tube 11 is a supporting member for attaching the two skid tubes 10 to the lower part of the fuselage 3 in a state where the two skid tubes 10 have been coupled to each other. Therefore, a length direction of each cross tube 11 is curved on a plane approximately perpendicular to the vertical axis X of the rotorcraft 1. One cross tube 11 is placed in the front side while the other cross tube 11 is placed in the rear side. Furthermore, each cross tube 11 deforms to play a role of absorbing energy when the rotorcraft 1 lands on the ground.

Each cross tube 11 is made of a composite material which is resin reinforced with fibers. Examples of a composite material include GFRP (glass fiber reinforced plastics), which is resin reinforced with glass fibers, CFRP (carbon fiber reinforced plastics), which is resin reinforced with carbon fibers, and Nomex (registered trademark), which is resin reinforced with papers.

The conventional skid tubes and cross tubes were made of a metal. Each composite material has a high specific rigidity compared with metals. Therefore, making at least the cross tubes 11, absorbing energy at the time of landing the rotorcraft 1, of a composite material leads to weight saving. As a matter of course, the skid tubes 10 may be also made of a composite material.

When each cross tube 11 is made of a composite material, it becomes possible to give anisotropy to mechanical characteristics of each cross tube 11. Specifically, composite material changes mechanical characteristics depending on a lamination direction of fibers, and has anisotropy. Accordingly, by taking advantage of the anisotropy of composite material, the rigidity of the cross tube 11 against bending in the vertical direction can be made small while the rigidity against tension in the length direction of the cross tube 11 can be made large. That is, the cross tube 11 having small bending strength and large tensile strength can be designed and produced.

Figure 3:
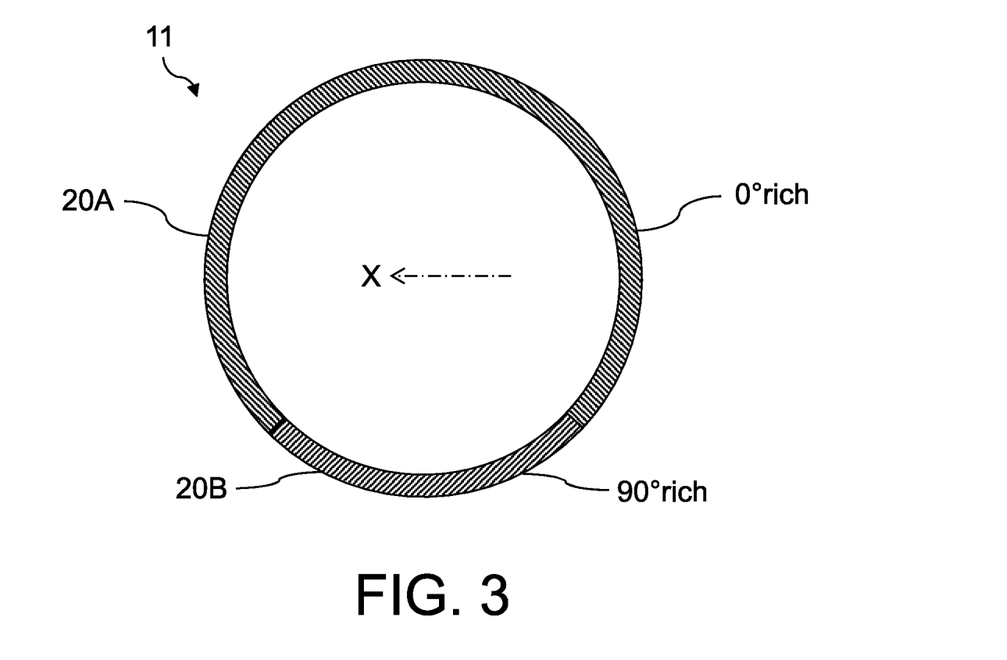
FIG. 3 is a cross sectional view showing an example of a structure of the cross tube shown in FIG. 1 and FIG. 2.

FIG. 3 is a cross sectional view showing an example of a structure of the cross tube 11 shown in FIG. 1 and FIG. 2.

As exemplified in FIG. 3, the cross tube 11 can be produce by assembling a curved plate-like composite material piece 20A with a curved plate-like composite material piece 20B. The composite material piece 20A can be bonded to the composite material piece 20B with adhesive or fasteners, for example. Alternatively, the composite material piece 20A and the composite material piece 20B may be co-cured. When the composite material piece 20A and the composite material piece 20B are co-cured, parts of the composite material piece 20A and the composite material piece 20B may be made of common fiber reinforced layers as described below.

The cross section of each of the composite material piece 20A and the composite material piece 20B has a circular arc shape. Therefore, when the composite material piece 20A is assembled with the composite material piece 20B, the cylindrical cross tube 11 are made. Since the cross tube 11 is curved in the length direction, each of the composite material piece 20A and the composite material piece 20B is also curved in the length direction.

The first composite material piece 20A can consist of a plate-like composite material which covers about ¾ range in the upper side of the cross tube 11. Meanwhile, the second composite material piece 20B can consist of a plate-like composite material which covers about ¼ range in the lower side of the cross tube 11. Then, an orientation angle of the fibers included in the first composite material piece 20A can be determined to be different from an orientation angle of the fibers included in the second composite material piece 20B.

Thereby, anisotropy can be given to the rigidity of the cross tube 11. Each composite material of which the length direction of the fibers is the length direction of the cross tube 11 has a high bending rigidity and a high tensile rigidity in the length direction of the cross tube 11. Meanwhile, each composite material of which the length direction of the fibers is the circumferential direction perpendicular to the length direction of the cross tube 11 has a low bending rigidity and a low tensile rigidity in the length direction of the cross tube 11.

Thus, among the fibers which reinforces the second composite material piece 20B in the lower side of the cross tube 11, the ratio of fibers which reinforces the second composite material piece 20B in the direction perpendicular to the length direction of the cross tube 11 can be made maximum. Meanwhile, among the fibers which reinforces the first composite material piece 20A covering the remaining part consisting of the front side, the upper side and the rear side of the cross tube 11, the ratio of fibers which reinforces the first composite material piece 20A in the length direction of the cross tube 11 can be made maximum.

Thereby, the skid 4 of which the cross tube 11 having a relatively small rigidity only in the lower side and a relatively large rigidity in the other portions including the front side, the upper side and the rear side can be produced.

A typical structural member of an aircraft is produced by combining composite materials of which orientation angles of fibers are 0 degrees, 45 degrees and 90 degrees. Accordingly, the first composite material piece 20A and the second composite material piece 20B composing the cross tube 11 can also be produced by combining composite materials of which orientation angles of fibers are 0 degrees, 45 degrees and 90 degrees.

When the cross section of the cross tube 11 is circular, fibers whose orientation angle is 90 degrees and length direction is the circumferential direction perpendicular to the length direction of the cross tube 11 have a circular arc shape on the cross section of the cross tube 11. Meanwhile, fibers whose orientation angle is 0 degrees and the length direction is the length direction of the cross tube 11 are seen as dots on the cross section of the cross tube 11.

It is important to give the minimum rigidity to the cross tube 11 in each direction. Accordingly, orientation angles of fibers can be determined so that both the first composite material piece 20A and the second composite material piece 20B include at least not less than 10% composite material whose orientation angle of fibers is 0 degrees and at least not less than 10% composite material whose orientation angle of fibers is 90 degrees, for example.

As a practical example, the first composite material piece 20A which covers the front side, the upper side and the rear side of the cross tube 11 can be a 0-degrees enriched composite material containing 50% composite material whose orientation angle of fibers is 0 degrees, 40% composite material whose orientation angle of fibers is 45 degrees and 10% composite material whose orientation angle of fibers is 90 degrees. Meanwhile, the second composite material piece 20B which covers the lower side of the cross tube 11 can be a 90-degrees enriched composite material containing 10% composite material whose orientation angle of fibers is 0 degrees, 40% composite material whose orientation angle of fibers is 45 degrees and 50% composite material whose orientation angle of fibers is 90 degrees.

When only the second composite material piece 20B which covers the lower side of the cross tube 11 is made of a 90-degrees enriched composite material while the first composite material piece 20A which covers the front side, the upper part and the rear side of the cross tube 11 is made of a 0-degrees enriched composite material, the cross tube 11 is easily bended only in the lower side, and hardly bended in the front side, the upper side and the rear side.

What is dominant for the bending rigidity of the cross tube 11 is mainly rigidity of the upper side and rigidity of the lower side. Meanwhile, what is dominant for the rigidity in the axis direction of the cross tube 11 is the rigidity of the entire circumference. Therefore, when the cross tube 11 has the above-mentioned lamination structure, the bending rigidity and the rigidity in the axis direction of the whole the cross tube 11 can be differentiated from each other, compared with a case where the cross tube 11 has a uniform lamination structure along the entire circumference. That is, the skid 4 composed of the cross tube 11 having a relatively low bending rigidity and a relatively high rigidity in the axis direction can be produced.

Figure 4:
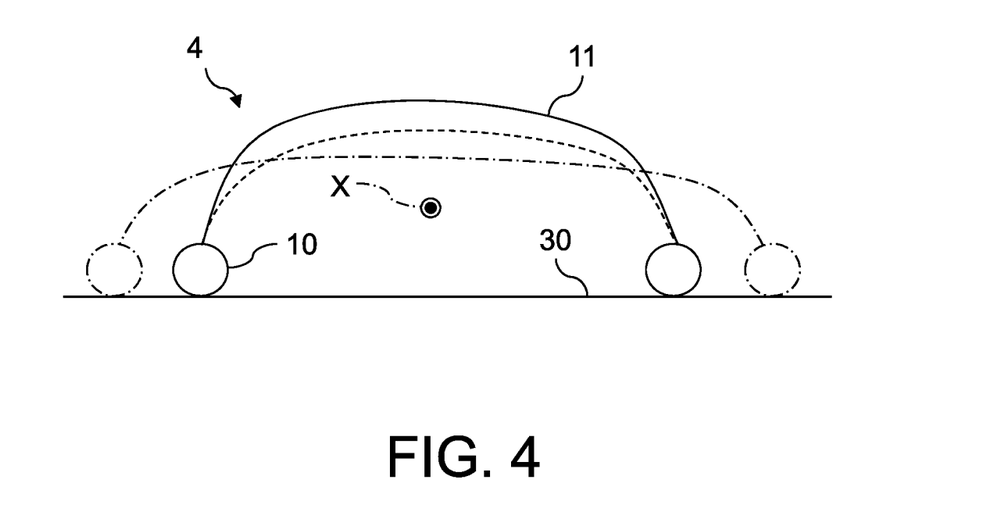
FIG. 4 shows deformed states of the cross tube shown in FIG. 1 to FIG. 3.

FIG. 4 shows deformed states of the cross tube 11 shown in FIG. 1 to FIG. 3.

When the rotorcraft 1 lands, a load in the vertical direction acts on each undeformed cross tube 11 having a curved shape as shown by the solid line in FIG. 4. Therefore, vertically downward bending deformation arises in each cross tube 11 as shown by the dotted line in FIG. 4.

When the bending deformation of the cross tube 11 becomes large, the cross tube 11 receives a load in an approximately horizontal direction. As a result, friction forces arise between the skid tubes 10 and a ground 30. When each of the friction forces between the skid tubes 10 and the ground 30 exceeds the maximum static friction force, the cross tube 11 deforms and expands in the horizontal direction as shown by the dashed-dotted line in FIG. 4. Accordingly, the skid tube 10 receives a tensile load as well as the bending load. Specifically, the cross tube 11 receives the bending load in an early stage of the deformation and subsequently receives the tensile load.

Thus, as exemplified in FIG. 3, the rigidity in the lower side of the cross tube 11 can be made small while the rigidity in the other parts can be made large. Thereby, in a stage where the rotorcraft 1 lands and a bending load in the vertical direction acts on the cross tube 11, the lower side of the cross tube 11 can be easily deformed to absorb energy sufficiently. After that, in a stage where the deformation of the cross tube 11 becomes large and a tensile load acts on the cross tube 11, increase in the deformation of the cross tube 11 can be suppressed by the rigidity given to the front side, the upper side and the rear side of on the cross tube 11. As a result, a contact of the fuselage 3 of the rotorcraft 1 with the ground 30 can certainly be avoided.

Figure 5:
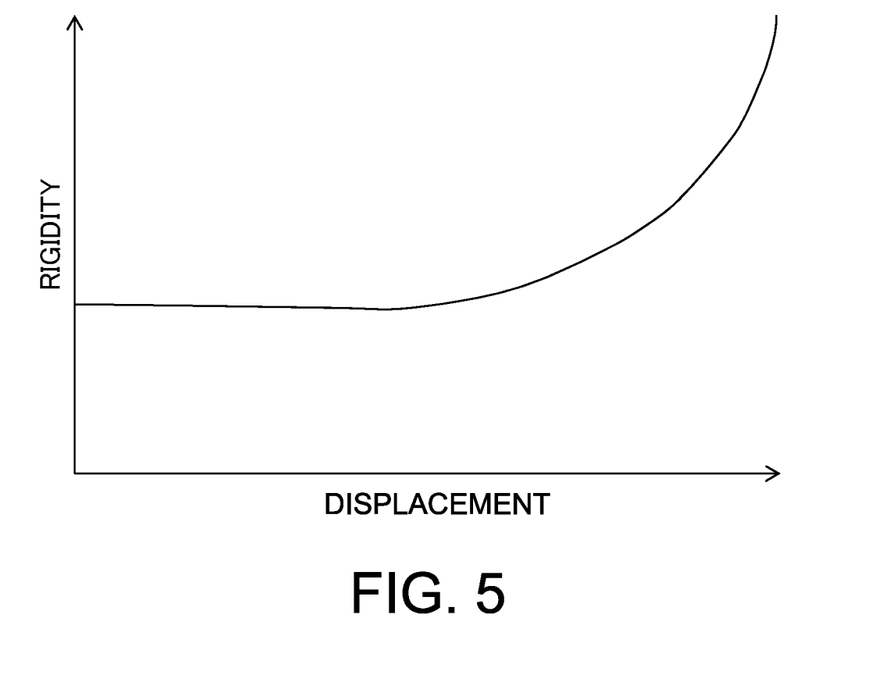
FIG. 5 is a graph showing an example of mechanical characteristics given to the cross tube shown in FIG. 1 to FIG. 3.

FIG. 5 is a graph showing an example of mechanical characteristics given to the cross tube 11 shown in FIG. 1 to FIG. 3.

In FIG. 5, the horizontal axis represents displacement of the cross tube 11, and the vertical axis represents the rigidity of the cross tube 11. When the rigidity in the lower side of the cross tube 11 is made small while the rigidity in the other parts is made large as exemplified in FIG. 3, the cross tube 11 having characteristics of nonlinearly changing rigidity to a change of displacement as shown in FIG. 5 can be produced. More specifically, mechanical characteristics expressed by a curved line which is downwardly convex in the coordinate system having the horizontal axis representing displacement and the vertical axis representing the rigidity as shown in FIG. 5 can be given to the cross tube 11.

When such a nonlinear characteristic that the rigidity becomes higher as the deformation becomes larger is given to the cross tube 11, an absorption amount of energy at the time of landing of the rotorcraft 1 can be secured while contact of the fuselage 3 of the rotorcraft 1 with the ground 30 can be avoided. The balance of an absorption amount of energy at the time of landing of the rotorcraft 1 and effect for avoiding contact of the fuselage 3 of the rotorcraft 1 with the ground 30 can be made preferable by adjusting orientations of the fibers included in the composite material.

The same effect can be obtained also when the second composite material piece 20B, which covers the ¼ range of the cross tube 11 and is made of a 90-degrees enriched composite material, and the first composite material piece 20A, which covers the ¾ range of the cross tube 11 and is made of a 0 degrees enriched composite material, are turned upside down. Specifically, the same effect can be obtained also by producing the skid 4 composed of the cross tube 11 having a relatively small rigidity only in the upper side and a relatively large rigidity in the other parts including the front side, the lower side and the rear side.

That is, rigidity which nonlinearly increases as displacement increases can be given to the cross tube 11 when a ratio of partial fibers reinforcing the upper side or the lower side of a composite material constituting the cross tube 11 in the direction perpendicular to the length direction of the cross tube 11, among all the fibers reinforcing the upper side or the lower side of the composite material, is maximized while a ratio of partial fibers reinforcing the other remaining parts of the composite material in the length direction of the cross tube 11, among all the fibers reinforcing the other remaining parts of the composite material, is maximized. As a result, effects of securing an absorption amount of energy at the time of landing of the rotorcraft 1 while avoiding contact of the fuselage 3 of the rotorcraft 1 with the ground 30 can be obtained.

Figure 6:
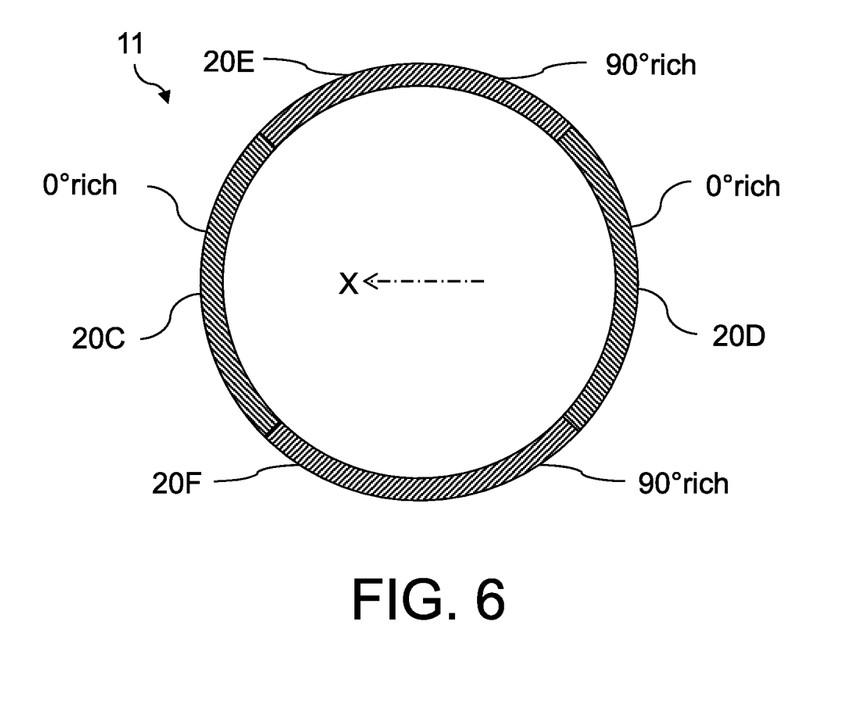
FIG. 6 is a cross sectional view showing another example of a structure of the cross tube shown in FIG. 1 and FIG. 2.

FIG. 6 is a cross sectional view showing another example of a structure of the cross tube 11 shown in FIG. 1 and FIG. 2.

As exemplified in FIG. 6, the cross tube 11 may be composed of four composite material pieces, consisting of the composite material piece 20C in the front side, the composite material piece 20D in the rear side, the composite material piece 20E in the upper side and the composite material piece 20F in the lower side. That is, the cross tube 11 may be divided into four parts.

In this case, each of the composite material piece 20C and the composite material piece 20D respectively disposed in the front side and the rear side of the cross tube 11 can be made of a 0-degrees enriched composite material, similarly to the first composite material piece 20A shown in FIG. 3. Meanwhile, each of the composite material piece 20E and the composite material piece 20F respectively disposed in the upper side and the lower side of the cross tube 11 can be made of a 90-degrees enriched composite material.

In an example of a quartered structure shown in FIG. 6, the range of a 90-degrees enriched composed material is large compared with an example of a structure divided into two shown in FIG. 3. Accordingly, a ratio of a composite material of which orientation angle of fibers is 90 degrees may be decreased. As a concrete example, each of the composite material piece 20E and the composite material piece 20F respectively disposed in the upper side and the lower side of the cross tube 11 may be made of a composite material in which a ratio of fibers whose orientation angle is 0 degrees is same as a ratio of fibers whose orientation angle of is 90 degrees while each of the composite material piece 20C and the composite material piece 20D respectively disposed in the front side and the rear side of the cross tube 11 may be made of a 0-degrees enriched composed material.

That is, intended anisotropy can be given to the cross tube 11 when a ratio of a composite material of which fibers has 90 degrees orientation angle included in the composite material piece 20E and the composite material piece 20F disposed in the upper side and the lower side of cross tube 11 is made larger than a ratio of a composite material of which fibers has 90 degrees orientation angle included in the composite material piece 20C and the composite material piece 20D disposed in the front side and the rear side of the cross tube 11. In other words, rigidity which nonlinearly increases as displacement increases can be given to the cross tube 11 as long as a ratio of partial fibers reinforcing the upper side and the lower side of the composite material constituting the cross tube 11 in the direction perpendicular to the length direction of the cross tube 11 among all the fibers reinforcing the upper side and the lower side of the composite material is made larger than a ratio of partial fibers reinforcing of the front side and the rear side of the composite material in the direction perpendicular to the length direction of the cross tube 11 among all the fibers reinforcing the front side and the rear side of the composite material.

In addition to the above-mentioned examples, a ratio of a composite material of which fibers has the orientation angle of 90 degrees may be changed gradually in not less than three steps as well as in two steps. Specifically, the cross tube 11 may be divided into parts smaller than the four parts i.e., the front side, the rear side, the upper side and the lower side in order to adjust orientations of fibers. Moreover, anisotropy may also be given to the cross tube 11 without necessarily using a composite material of which fibers has the orientation angle of 0 degrees and a composite material of which fibers has the orientation angle of 90 degrees. As a concrete example, a ratio of a composite material consisting of fibers of which orientation angle is 45 degrees and a ratio of a composite material consisting of fibers of which orientation angle is 60 degrees may be adjusted in order to design and produce the cross tube 11 of which rigidity changes nonlinearly depending on displacement.

Concrete orientations of fibers can be determined by simulations or tests so that an intended nonlinear change of rigidity can be obtained.

The hollow cross tube 11 made of a composite material can be produced by a desired method. Typical methods of molding a composite material include: a method for laminating sheet like prepregs consisting of fibers impregnated with uncured thermosetting resin, shaping a laminated body of the prepregs according to a shape of composite material, and heating and curing the shaped laminated body of the prepregs with an autoclave molding apparatus; and an RTM (Resin Transfer Molding) method.

An RTM method is a method for molding a composite material by which sheet like fibers are impregnated with thermosetting resin after laminating and shaping the sheet like fibers, and subsequently, the fibers impregnated with the thermosetting resin are thermally cured. A method of using a vacuum pressure for impregnating fibers with a resin, out of RTM methods, is called a VaRTM (Vacuum assisted Resin Transfer Molding) method. Moreover, the cross tube 11 may be produced with a hybrid molding method which uses an RTM method together with lamination of prepregs.

The cross tube 11 is hollow. Therefore, the cross tube 11 can be integrally molded by a production method of laminating prepregs or fiber sheets on a water-soluble core and removing the core after molding the composite material by thermal curing of the fibers impregnated with a resin, for example. In this case, when the cross tube 11 is divided into two as exemplified in FIG. 3, the cross tube 11 can be produced by laminating at least two kinds of prepregs or fiber sheets of which reinforcing directions are different from each other. Therefore, production labor can be reduced.

As another production method, a method of separately heating and curing curved composite material pieces composing the cross tube 11, and subsequently, assembling the curved composite material pieces can be mentioned. In this case, when the cross tube 11 is compose of the four composite material pieces, i.e., the composite material piece 20C in the front side, the composite material piece 20D in the rear side, the composite material piece 20E in the upper side and the composite material piece 20F in the lower side, as exemplified in FIG. 6, each of the composite material piece 20C, the composite material piece 20D, the composite material piece 20E and the composite material piece 20F can be thermally cured by a mold with a convexly curved surface. After the thermal curing, the composite material piece 20C, the composite material piece 20D, the composite material piece 20E and the composite material piece 20F can be assembled. Thereby, the cross tube 11 can be produced. Therefore, when the cross tube 11 is divided into four as exemplified in FIG. 6, producing the cross tube 11 by molds becomes easy.

Meanwhile, also in a case where the cross tube 11 consists of the two composite material pieces 20A and 20B as exemplified in FIG. 3, the first composite material piece 20A which covers the front side, the upper side and the rear side of the cross tube 11 can be thermally cured using a water-soluble core, a flexible bladder bag or the like while the second composite material piece 20B which serves as the lower side of the cross tube 11 can be thermally cured using a mold with a convexly curved surface. After the molding, the first composite material piece 20A and the second composite material piece 20B can be assembled into the cross tube 11. In this case, assembly work becomes easy compared with a case where the cross tube 11 is divided into four since objects to be assembled are the two composite material pieces 20A and 20B.

As a matter of course, the first composite material piece 20A which covers the front side, the upper side and the rear side may be further divided into two composite material pieces so that molds can be removed from the composite material pieces. In this case, the cross tube 11 shown in FIG. 3 can be produced by thermal curing of three composite material pieces with molds and assembling the thermal cured three composite material pieces.

When the cross tube 11 is produced by assembly without integral molding, composite material pieces can be bonded to each other with adhesive or metal fittings.

When the cross tube 11 is produced by assembly, the cross tube 11 may be divided in the length direction. In that case, when the cross tube 11 is divided into parts with such lengths that cores can be pulled out, each part, composed of composite material pieces, of which cross section is circular can be integrally molded.

When the cross tube 11 is integrally molded in the circumferential direction, like a case of dividing the cross tube 11 in the length direction, a case of molding the cross tube 11 with a water-soluble core, or the like, a part of fiber reinforced layers may be made common between arch-shaped composite materials of which fibers have partially different orientation angles from each other as mentioned above FIG. 7 is a partial enlarged cross sectional view showing an example where a part of two plate-like composite materials, of which orientation angles of fibers are different from each other, is made by common fiber reinforced layers.

Figure 7:
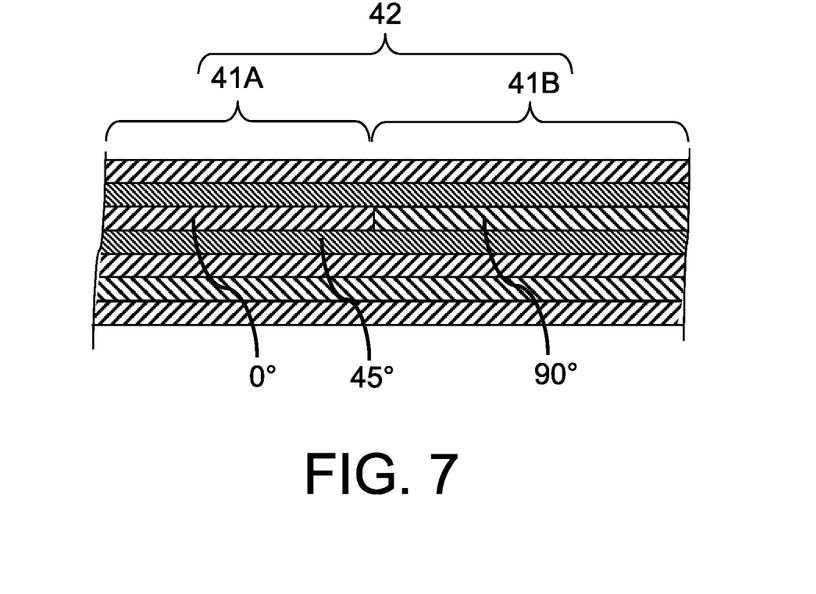
FIG. 7 is a partial enlarged cross sectional view showing an example where a part of two plate-like composite materials, of which orientation angles of fibers are different from each other, is made by common fiber reinforced layers.

When one plate-like composite material 42 is produced by connecting end parts of two plate-like composite material pieces 41A and 41B of which sets of orientation angles of fibers are different from each other, a part of the fiber reinforced layers can be made common, as shown in FIG. 7. Specifically, only at least one specific layer of the two composite material pieces 41A and 41B can be made by fiber reinforced layers whose length directions of fibers are different from each other.

In an example shown in FIG. 7, the composite material piece 41A differs from the composite material piece 41B in only one layer, and the layer in the composite material piece 41A includes fibers whose length direction is 0 degrees while the layer in the composite material piece 41B includes fibers whose length direction is 90 degrees. Meanwhile, the other layers of both the composite material pieces 41A and 41B consists of common fiber reinforced layers including fibers whose length directions are 0 degrees, 45 degrees and 90 degrees.

As described above, the rotorcraft 1 includes the skid 4, which is a landing gear, composed of the cross tubes 11 each made of a composite material. Moreover, the above-described skid 4 has the cross tubes 11 to which rigidity changing nonlinearly depending on displacement has been given by taking advantage of anisotropy of composite material.

(Effects)

Therefore, according to the rotorcraft 1 to which the skid 4 has been attached, weight saving can be attained compared with a conventional rotorcraft to which a metal skid has been attached. Moreover, both sufficient energy absorption at the time of landing of the rotorcraft 1 and preventing the fuselage 3 from contacting with the ground 30 can be attained more certainly by giving rigidity, changing nonlinearly depending on displacement, to the cross tubes 11.

(Second Implementation)

Figure 8:
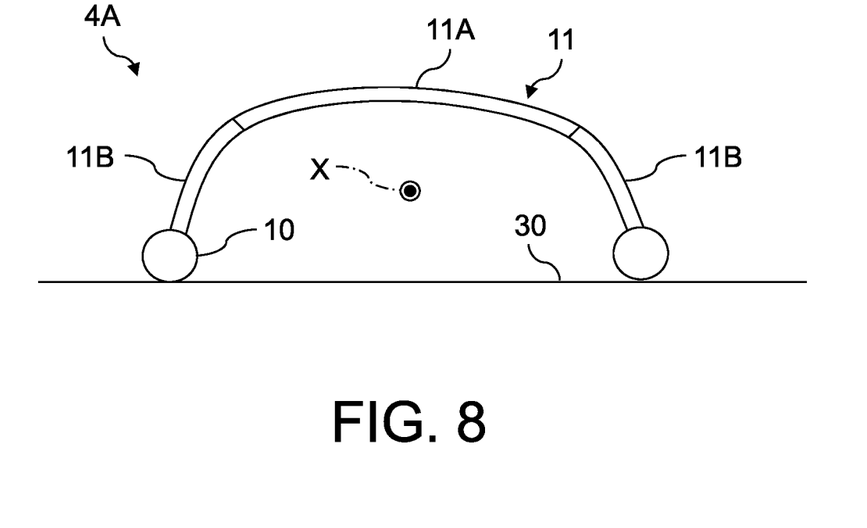
FIG. 8 is a front view showing a structure of a skid as a landing gear according to the second implementation of the present invention.

FIG. 8 is a front view showing a structure of a skid as a landing gear according to the second implementation of the present invention.

A skid 4A in the second implementation shown in FIG. 8 is different from the skid 4 in the first implementation in a point that a part of the cross tube 11 is made of a composite material, instead of making the whole cross tube 11 with the composite material. Since other structures and actions of the skid 4A in the second implementation are not substantially different from those of the skid 4 in the first implementation, only the skid 4A is illustrated, and explanation of the same elements and the corresponding elements will be omitted with attaching the same signs.

As exemplified in FIG. 8, the center portion 11A, of which curve quantity is small, of the cross tube 11 may be made of a composite material while the both end portions 11B of the cross tube 11 may be made of a metal. In this case, it becomes easy to pull out a bladder bag or a core at the time of producing the tubular composite material since the curve quantity of the tubular composite material is small. As a result, producing the cross tube 11 becomes easy. Specifically, it becomes easy to integrally mold the cross tube 11 in the circumferential direction. Note that, the center portion 11A made of a composite material can be coupled to each end portion 11B made of a metal with adhesive or fasteners.

As described above, when at least a part of the cross tube 11 is made of a composite material, the weight of the cross tube 11 can be saved and nonlinearly changing rigidity can be given to the cross tube 11. When rigidity which changes nonlinearly is given to the cross tube 11, both sufficient energy absorption at the time of landing of the rotorcraft 1 and preventing the fuselage 3 from contacting with the ground can be attained more certainly.

(Third Implementation)

Figure 9:
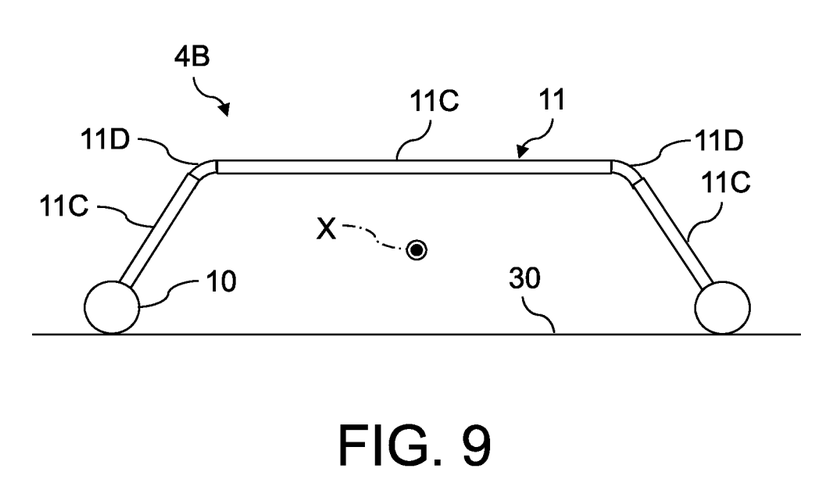
FIG. 9 is a front view showing a structure of a skid as a landing gear according to the third implementation of the present invention.

FIG. 9 is a front view showing a structure of a skid as a landing gear according to the third implementation of the present invention.

A skid 4B in the third implementation shown in FIG. 9 is different from the skid 4A in the second implementation in a point that the cross tube 11 is composed of non-curved portions 11C, each made of a composite material, and curved portions 11D, each made of a metal. Since other structures and actions of the skid 4B in the third implementation are not substantially different from those of the skid 4A in the second implementation, only the skid 4B is illustrated, and explanation of the same elements and the corresponding elements will be omitted with attaching the same signs.

As shown in FIG. 9, the cross tube 11 can be composed of non-curved portions 11C and curved portions 11D. Specifically, the center portion and both the end portions of the cross tube 11 can be consist of the non-curved portions 11C respectively while the center portion is coupled to each of the non-curved portions 11C in both sides with the curved portion 11D.

In this case, it becomes possible to pull out cores from the non-curved portions 11C easily. Therefore, it becomes possible to produce each non-curved portion 11C easily by integrally molding composite materials whose combinations of orientation angles of fibers are not same as each other. As a result, merits of composite material can be used effectively. Specifically, while each curved portion 11D, which is difficult to be made of a composite material, can be made of a metal so that each curved portion 11D can be produced easily, each non-curved portion 11C, which is easy to be made of a composite material, can be made of a composite material in order to attain weight saving and nonlinearly changing rigidity which can be achieved by taking advantage of merits of composite material.

Note that, the non-curved portion 11C made of a composite material can be coupled to the curved portion 11D made of a metal with adhesive or fasteners.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A landing gear of a rotorcraft, the landing gear comprising:
   first and second skid tubes; and
   a cross tube for coupling the first and second skid tubes to each other and attaching the first and second skid tubes to a fuselage of the rotorcraft,
   wherein the cross tube includes:
      a first end connected to the first skid tube;
      a second end connected to the second skid tube; and
      a center portion extending between the first end and the second end, and
   wherein the first end and the second end of the cross tube is made of a metal while the center portion of the cross tube is made of a composite material.

2. The landing gear according to claim 1,
   wherein the center portion of the cross tube is not curved, and
   wherein the first end and the second end of the cross tube are curved.

3. The landing gear according to claim 2, wherein the cross tube has a characteristic that a rigidity changes nonlinearly to a displacement change.

4. The landing gear according to claim 1, wherein the cross tube has a characteristic that a rigidity changes nonlinearly to a displacement change.

5. The landing gear according to claim 4, wherein the characteristic is expressed by a downwardly convex curved line in a coordinate system of which a horizontal axis represents the displacement and a vertical axis represents the rigidity.

6. The landing gear according to claim 4,
wherein the center portion of the cross tube is not curved, and
wherein the first end and the second end of the cross tube are curved.

7. The landing gear according to claim 1,
wherein the composite material constituting the center portion of the cross tube includes first fibers and second fibers,
wherein the first fibers reinforce an upper side and a lower side of the composite material,
wherein the second fibers reinforce a front side and a rear side of the composite material,
wherein the first fibers include first partial fibers reinforcing the upper side and the lower side of the composite material in a direction perpendicular to a length direction of the cross tube,
wherein the second fibers include second partial fibers reinforcing the front side and the rear side of the composite material in the direction perpendicular to the length direction of the cross tube, and
wherein a ratio of the first partial fibers to the first fibers is larger than a ratio of the second partial fibers to the second fibers.

8. The landing gear according to claim 1,
wherein the composite material constituting the center portion of the cross tube includes third fibers and fourth fibers,
wherein the third fibers reinforce one of an upper side and a lower side of the composite material,
wherein the fourth fibers reinforce a remaining part of the composite material,
wherein the third fibers include third partial fibers reinforcing the one of the upper side and the lower side in a direction perpendicular to a length direction of the cross tube,
wherein a ratio of the third partial fibers to the third fibers is maximized,
wherein the fourth fibers include fourth partial fibers reinforcing the remaining part of the composite material in the length direction of the cross tube, and
wherein a ratio of the fourth partial fibers to the fourth fibers is maximized.

9. A rotorcraft comprising:
the landing gear according to claim 1.

10. A rotorcraft comprising:
the landing gear according to claim 2.

11. A rotorcraft comprising:
the landing gear according to claim 4.

12. A rotorcraft comprising:
the landing gear according to claim 5.

13. A method of landing a rotorcraft, the method comprising:
constituting a center portion of a cross tube with a composite material while constituting a first end and a second end of the cross tube with a metal, wherein the cross tube couples first and second skid tubes to each other by connecting the first end of the cross tube to the first skid tube, the second end of the cross tube to the second skid tube, and allowing the center portion of the cross tube to extend between the first end and the second end, wherein the cross tube attaches the first and second skid tubes to a fuselage of the rotorcraft, and wherein the first and second skid tubes compose a landing gear of the rotorcraft; and
preventing the fuselage from contacting a ground while securing an absorption amount of energy, using the cross tube, when the rotorcraft lands.

14. The method according to claim 13,
wherein orientations of fibers included in the composite material are adjusted in order to prevent the fuselage from contacting the ground while securing the absorption amount of the energy when the rotorcraft lands.

* * * * *